United States Patent [19]

Cholet et al.

[11] 4,203,501
[45] May 20, 1980

[54] DEVICE FOR EMITTING ACOUSTIC WAVES IN A LIQUID MEDIUM

[75] Inventors: Jacques Cholet, Rueil-Malmaison; Jean Laurent, Saint Germain-en-Laye; Pierre Magneville, Vernouillet; Claude Ducongé, Le Vesinet, all of France

[73] Assignee: Institute Francais du Petrole, Rueil-Malmaison, France

[21] Appl. No.: 904,324

[22] Filed: May 9, 1978

Related U.S. Application Data

[62] Division of Ser. No. 417,570, Nov. 20, 1973, Pat. No. 4,103,280.

[30] Foreign Application Priority Data

Nov. 29, 1972 [FR] France ............... 72.42515

[51] Int. Cl.² ............... G01V 1/04; F16J 1/10
[52] U.S. Cl. ............... 181/120; 92/85 B; 92/129; 251/63; 251/63.4
[58] Field of Search ............... 92/84, 110, 113, 20, 92/27, 28, 108, 129, 85 B; 91/41, 44, 394, 530, 531, 534; 340/8.5, 8.2, 8 PC, 8 MM, 8 FT, 8 LF, 8 D, 8 C, 8 R, 9, 10, 11, 12 A, 12 SD, 12 R; 181/119, 120; 251/63, 63.4

[56] References Cited

U.S. PATENT DOCUMENTS

| | | | |
|---|---|---|---|
| 1,874,135 | 8/1932 | Spoor | 251/63 |
| 2,755,774 | 7/1956 | Floyd | 91/394 |
| 3,002,354 | 10/1961 | Dorkins | 92/129 |
| 3,379,273 | 4/1968 | Chelminski | 340/7 R |
| 3,532,182 | 10/1970 | Bouyoulos | 181/119 |
| 3,557,550 | 1/1971 | Legarra | 91/394 |
| 3,564,492 | 2/1971 | Magneville | 340/12 R |
| 3,792,425 | 2/1974 | Magneville | 340/12 R |

*Primary Examiner*—Abraham Hershkovitz
*Attorney, Agent, or Firm*—Craig and Antonelli

[57] ABSTRACT

This device comprises two movable elements of rigid material tightly interconnected by means of a deformable membrane forming therewith a tight internal enclosure, means for varying abruptly the volume of said enclosure by successively moving the two elements away from each other, maintaining them in spaced relationship and allowing them to be urged toward each other by the effect of the external hydrostatic pressure, in which the means for moving the two elements away from each other includes two cylinders and at least one piston slidable in one of said cylinders, associated to one of said movable elements and also to a push-member slidable in one of the cylinders and bearing on the other movable element and means for feeding said cylinder with pressurized fluid so as to maintain the elements in spaced relationship or to release them.

8 Claims, 8 Drawing Figures

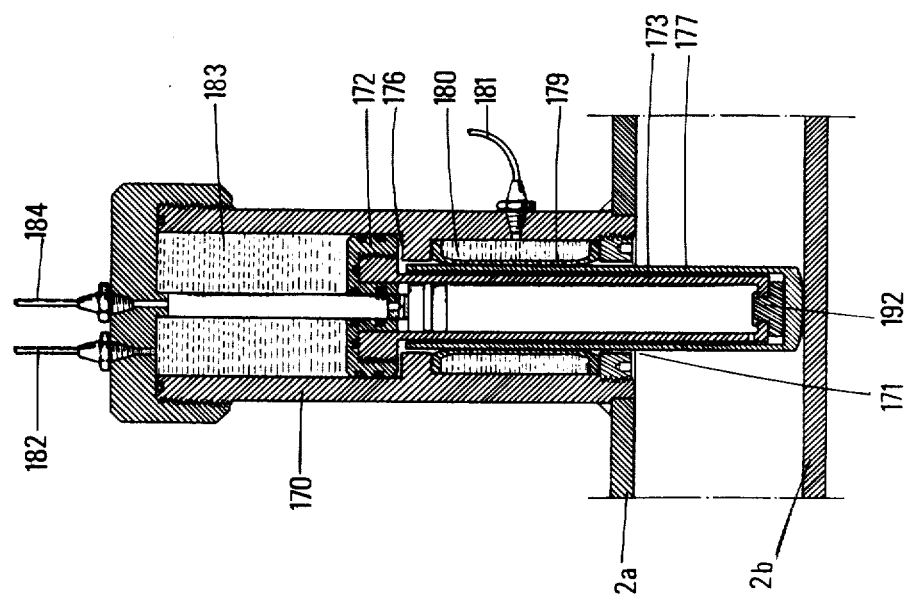
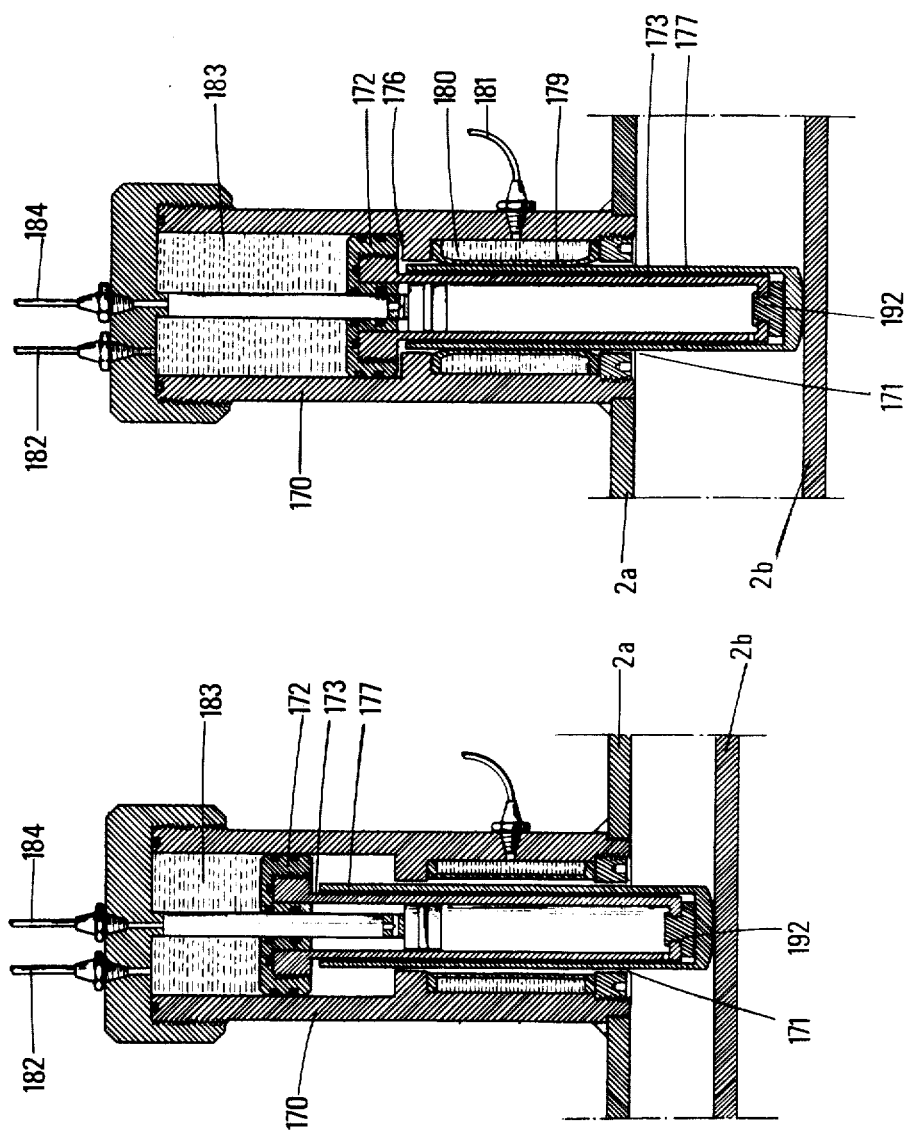
FIG. 2
FIG. 3

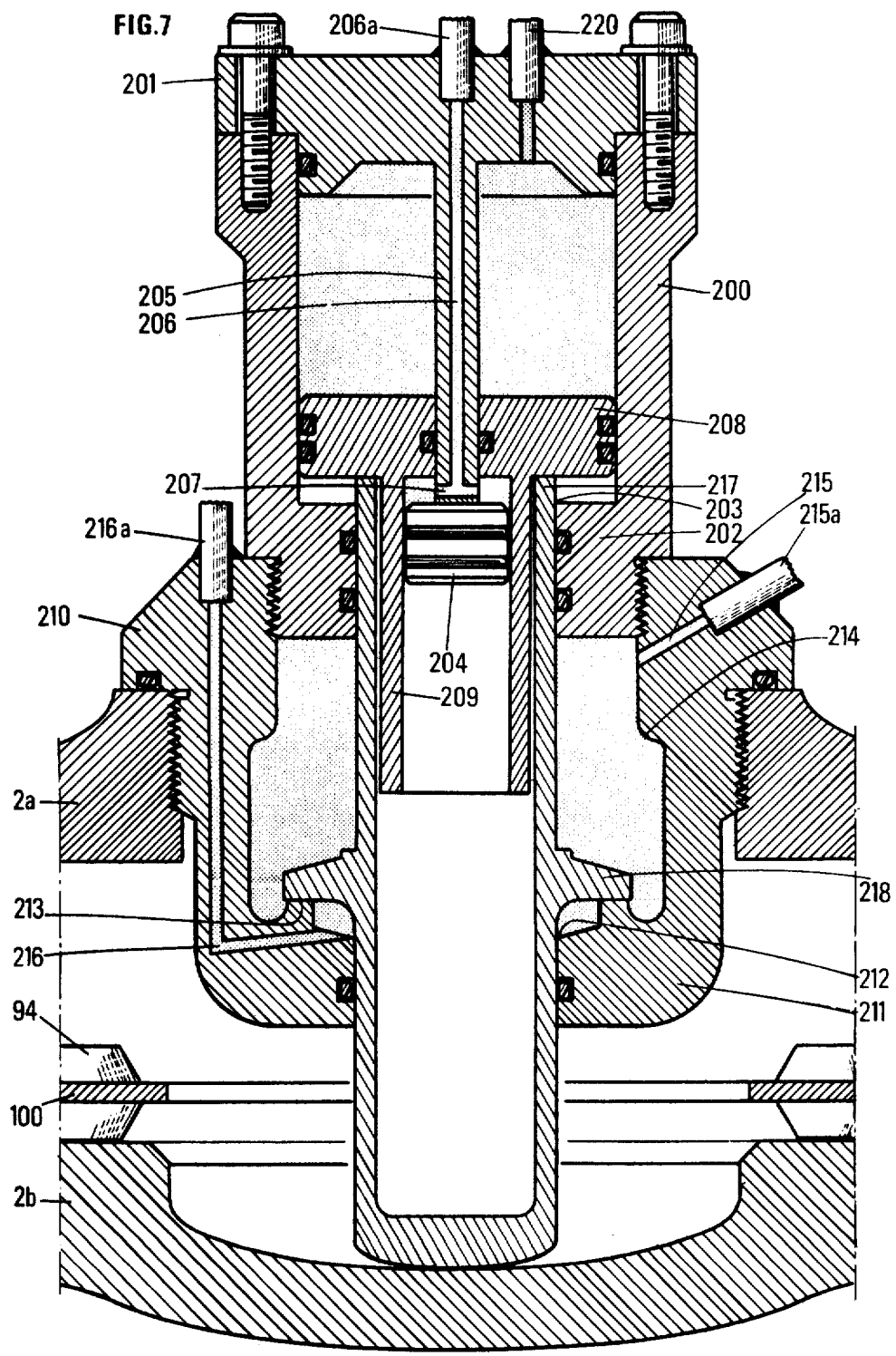

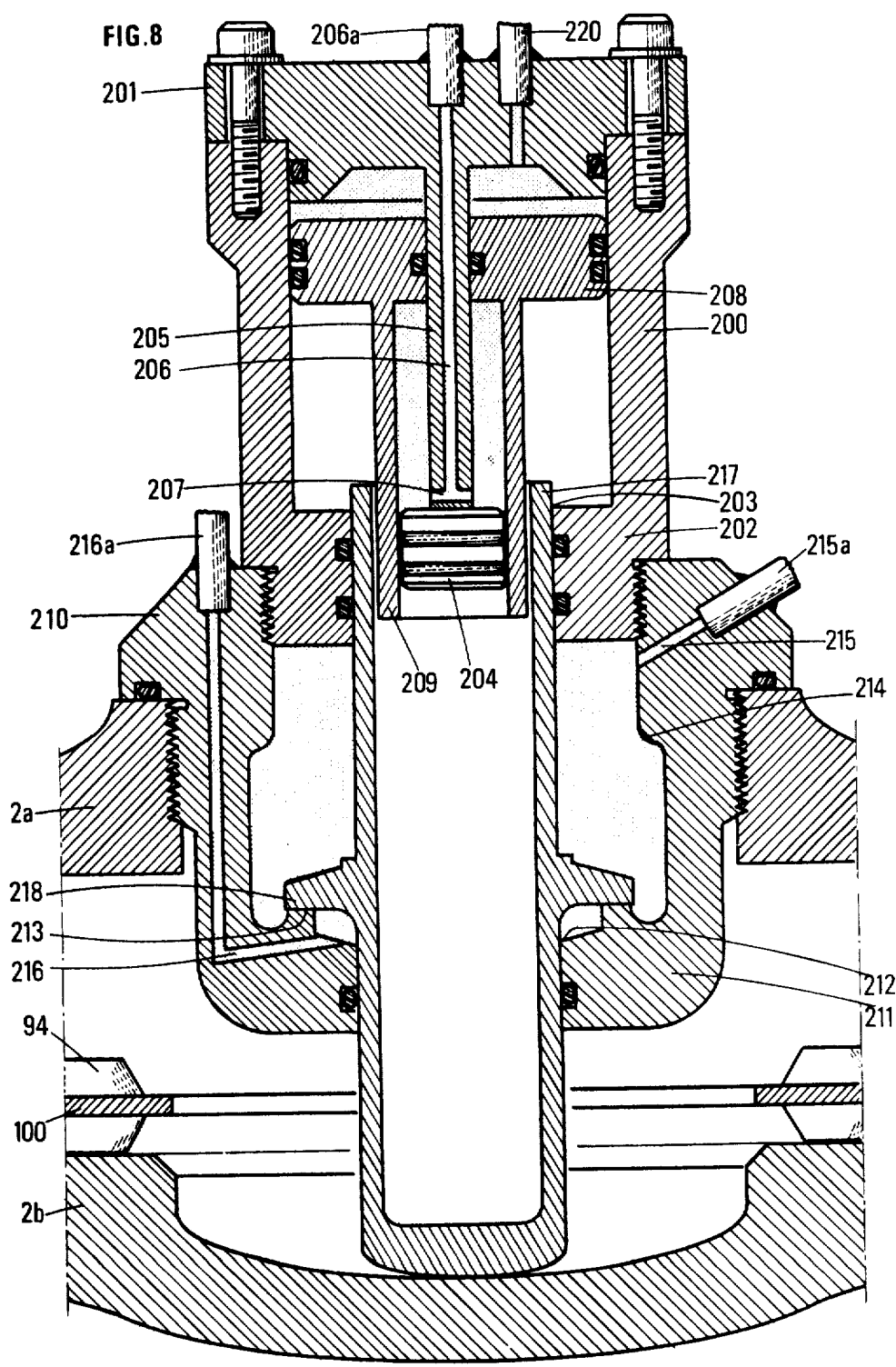

DEVICE FOR EMITTING ACOUSTIC WAVES IN A LIQUID MEDIUM

This is a division of application Ser. No. 417,570, filed Nov. 20, 1973, now U.S. Pat. No. 4,103,280.

The U.S. Pat. No. 3,564,492 describes a device for emitting acoustic waves in a liquid medium, comprising essentially two substantially identical movable elements opposite to each other, made of a rigid material and tightly interconnected by means of an annular membrane of deformable material forming with said elements a tight enclosure.

This emission source is provided with means for moving said elements away from each other and for initiating the movement bringing said elements into contact with each other, means for locking said elements in spaced relationship and means for unlocking them so that the elements are urged toward each other by the effect of the hydrostatic pressure and of the external atmospheric pressure.

These elements comprise at least one mutual contact area when urged against each other and are associated with means for creating within said enclosure a lower pressure than that prevailing outside said enclosure.

This application has for object an improvement of said device, consisting of a new arrangement of the system comprising the means for moving the elements away from each other and for urging them toward each other and of the locking and unlocking means, consisting of a hydraulic system.

This system essentially comprises: at least one cylinder and at least one piston slidable thereinto, associated with one of the movable elements and also a push-member slidable in said cylinder and adapted to take its bearing on the other movable element. It also comprises means for feeding said cylinder with pressurized fluid and a system for locking in position the push-member.

Preferably this device will comprise two cylinders and two pistons which cooperate for the actuation of the push-member.

This device, as compared to that described in the U.S. Pat. No. 3,564,492, has the advantage of a great simplicity of construction which results in a noticeable cost reduction.

More particularly it makes it possible to omit the assembly of articulated arms whose manufacture is difficult.

Furthermore the relative locations of the piston results in the advantage of a less bulky device.

The improvement according to the invention will be described more in detail with reference to the accompanying drawings in which:

FIG. 2 is a cross-sectional view of the system of FIG. 1, showing the movable elements being moved away from each other;

FIG. 3 is a cross-sectional view of the system of FIG. 1, showing the movable elements in their final (most remote) spaced position;

Figure 6:
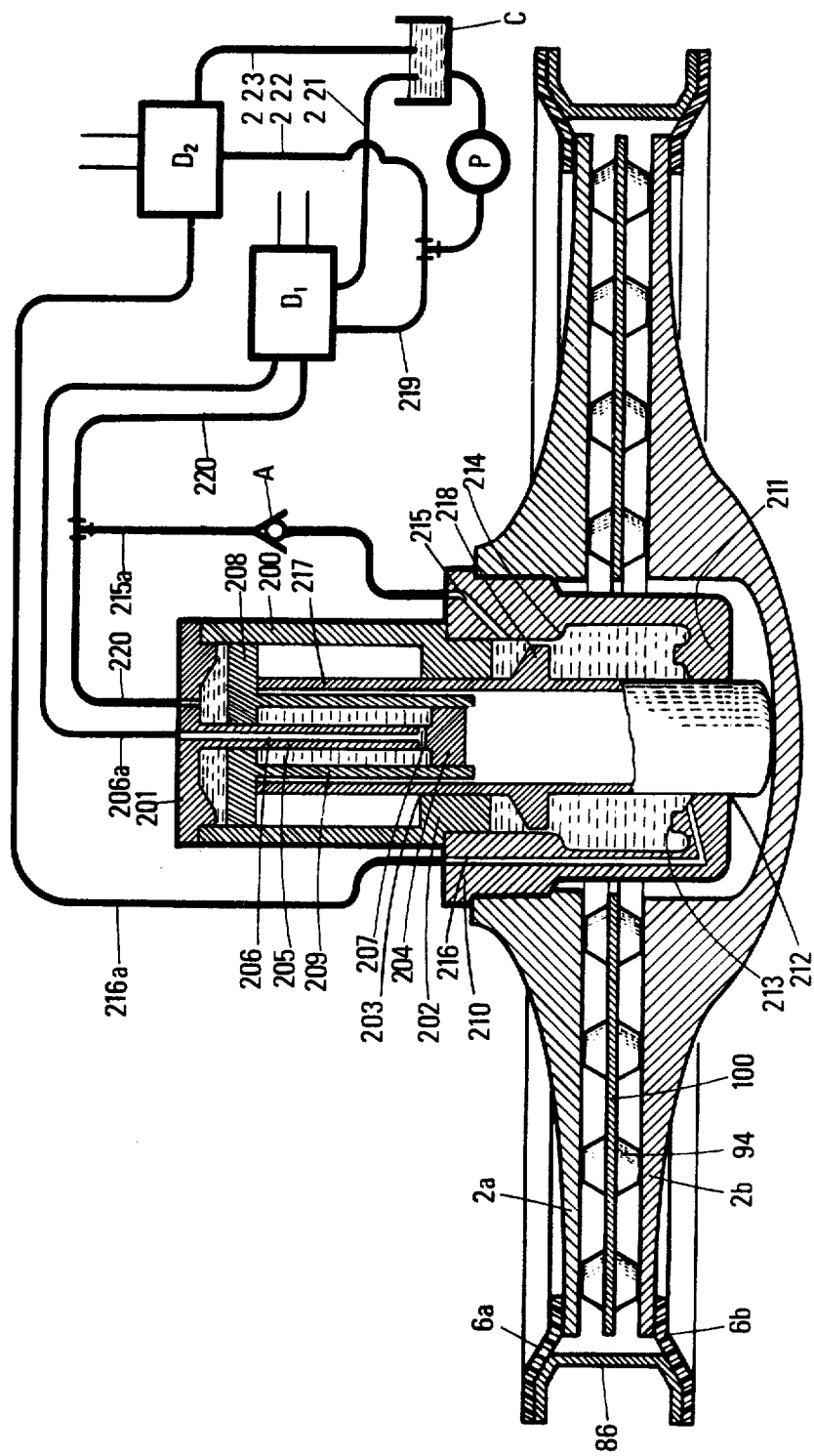

FIG. 6 diagrammatically shows a cross-section of a third embodiment of device equipped with an operative hydraulic system and feeding circuits, the movable elements being in position of contact;

FIG. 7 is an enlarged cross-sectional view of the hydraulic system of FIG. 6 showing the movable elements in their final spaced position, and FIG. 8 is an enlarged cross-sectional view of the hydraulic system of FIG. 6 in which the movable elements are locked in their final spaced position, and ready for release.

According to the first embodiment shown in FIGS. 1, 2, 3 and 4, the emitting device comprises, as described in the U.S. Pat. No. 3,564,492, two movable elements 2a and 2b. Two annular plates or bands 6a and 6b of elastic material are secured by their internal circumference respectively to the external circumference of one of the movable elements 2a, 2b, by means of clamping bolts 85. The external circumference of each band is secured to an annular coupling flange 86, by means of clamping bolts 87. Metal rings 88 are placed under the heads of the clamping bolts and the annular bands in order to prevent any deterioration of the elastic material. Annular protrusions 89, 90 are respectively provided on the edge portion of elements 2a, 2b and on the edge portion of the coupling flange 86. The deformable membranes 6a, 6b, by their adaptation to the shape of these protrusions, ensure the internal tightening of the enclosure.

The hydraulic system, used according to the present improvement for the locking and the unlocking of the movable elements, is solid with one of these elements 2a.

It comprises essentially a first cylinder 170 solid with element 2a and in communication with the internal enclosure of the device, through an opening 171. A first piston 172 slides in the first cylinder 170. This piston is provided with a hollow stem 173 acting as a second cylinder. The latter slides along and surrounds a second piston 174 secured to the closed end of the first cylinder 170, by means of a rod 175 around which the first piston 172 slides.

The stroke of piston 172 is limited by an internal shoulder 176 of cylinder 170. The first piston 172 and the second cylinder 173 solid therewith are free in the assembly.

A push-member consisting of a cylindrical tube 177 whose length is at most equal to the internal length of cylinder 170, less the thickness of piston 172 and whose diameter is slightly less than the internal diameter of shoulder 176, is adapted to freely slide in cylinder 170, around the second cylinder 173. A fastening ring 178 obturates the space 171 between the slidable tube 177 and the internal wall of cylinder 170.

A cylindrical membrane 179, of elastic material, is tightly placed inside the cylinder 170, in the part of the cylinder between the shoulder 176 and the ring 178. A space is left free between the membrane and the cylinder so as to form a tight cylindrical compartment 180.

A fluid feeding circuit, not entirely shown, comprises a pipe 181 feeding the chamber 180, a pipe 182 feeding the compartment 183 delimited by the closed end of cylinder 170 and the piston 172, and a pipe 184 feeding the compartment 185 delimited in said second cylinder 173 by the first piston 172 and the second piston 174 connected to the stem 175.

The compartments 180, 183 and 185, of variable volume, are destined to contain a fluid such as, for example, oil.

Figure 1:
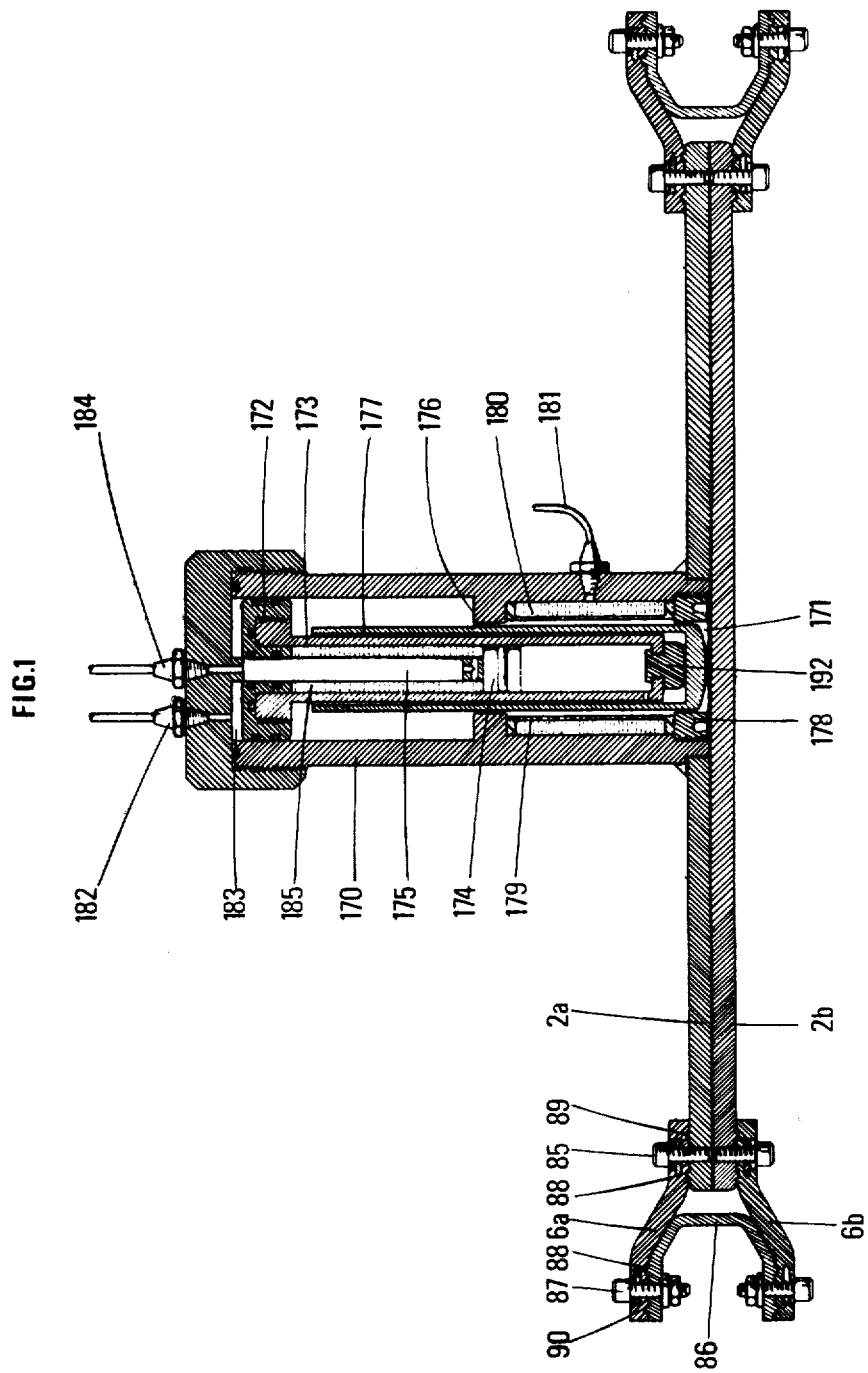
FIG. 1 is a cross-sectional view of a first embodiment of the system for moving the elements away from each other, adapted to the emitting device shown with the movable elements in position of contact.

The operation of the device is illustrated by figures 1, 2, 3 and 4. In FIG. 1 the movable elements 2a and 2b are in a position of contact. In that case the piston 172 is at the bottom of the cylinder 170, near the closed end wall thereof. The compartment 183 is reduced to its minimum value and the compartment 185 has its maximum volume. The sliding tubular member 177 is completely inside the cylinder 170, a clearance being provided between said tube 177 and the cylindrical membrane 179.

Oil is introduced, through pipe 182, into the compartment 183 between the end closure of cylinder 170 and piston 172. The latter is consequently pushed toward the other end of the cylinder, until it reaches the annular shoulder 176 forming an abutment. The oil contained in the compartment 185 is discharged through pipe 184. During its motion, the piston 172 drives, through cylinder 173, the pipe 177 which slides in the cylinder 170. A damping element, e.g. a rubber plug 192, is inserted between the bottom of the second cylinder 173 and the bottom of the tubular member 177, in order to avoid any deterioration of these elements when they are brought into contact.

The end of the tubular member opposite to said piston takes its bearing on the movable element 2b, thereby producing the displacement of the movable elements away from each other (FIG. 2). The pressure in the internal tight enclosure of the device is decreased to a level much lower than that of the external pressure, as it is described in the U.S. Pat. No. 3,564,492. The vacuum system is not shown.

When the elements 2a and 2b are in their most remote position with respect to each other (FIG. 3) oil is introduced, through pipe 181, into the compartment 180, so that the cylindrical membrane 179 of elastic material may be strongly pressed against the external surface of the tubular member 177.

Figure 4:
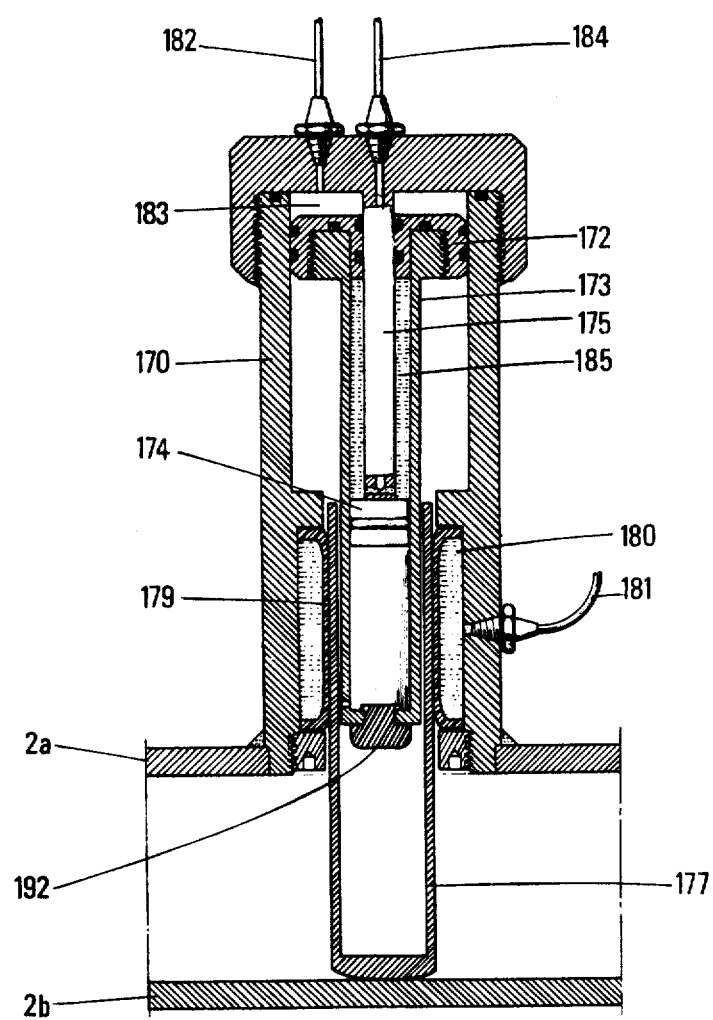
FIG. 4 is a cross-sectional view of the system of FIG. 1 just before the emission.

Subsequently oil is introduced through pipe 184 into the compartment 185 for displacing the first piston 172 toward the bottom of the first cylinder 170. The tubular member 177 strongly pressed by the membrane 179 suffices to maintain by itself the spacing of the elements 2a and 2b (FIG. 4).

For emitting the sonic pulse it merely suffices to release the pressure in compartment 180. As a consequence, the membrane 179 no longer presses against the tubular member 177, which becomes free to slide, and the movable elements 2a and 2b, by the simultaneous effect of the hydrostatic pressure to which they are externally subjected and of the much lower pressure prevailing inside the enclosure, are abruptly used toward each other, thereby generating, at the moment of the resulting shock, an acoustic wave which is conveniently used in seismic prospecting.

Figure 5:
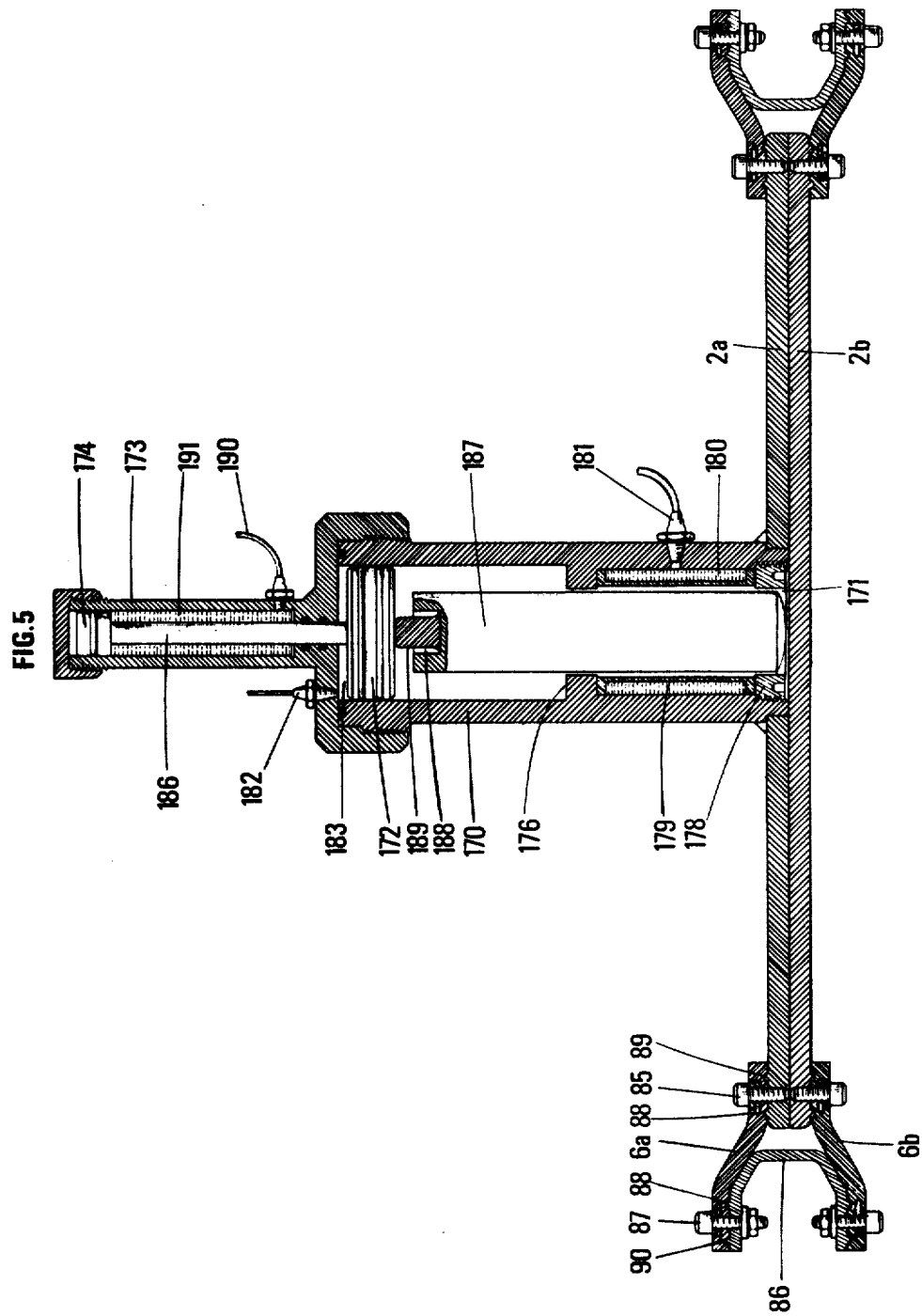
FIG. 5 is a cross-sectional view of a second embodiment of the system for moving the elements away from each other, shown in position of contact.

A second embodiment of the system for moving the members away from each other is illustrated in FIG. 5. It comprises a first cylinder 170 secured to one of the elements (2a) and in which a first piston 172 is slidably mounted. A second cylinder 173 is secured to the first cylinder 170. A second piston 174, slidable in said second cylinder 173, is connected to the first piston 172 through a common rod 186. The assembly formed by both pistons and their common rod is freely displaceable. The stroke of the first piston 172 is limited by an annular shoulder 176 inside the first cylinder.

A push-member consisting of a cylinder 187 whose height does not exceed the internal height of the first cylinder less the thickness of the first piston, and whose diameter is slightly less than the internal diameter of the shoulder 176, is freely slidable in cylinder 170. It is guided, on the one hand, by the shoulder 176 and, on the other hand, by the fastening ring 178, at the level of the opening 171 of the first cylinder and extending in the direction of the internal enclosure of the device.

The push-member 187 is provided, at the end thereof which is close to piston 172, with a recess housing a damping element 189.

An elastic cylindrical membrane is placed between the shoulder 176 and the fastening ring 178 and secured thereto, in the same manner as according to the first embodiment hereabove described.

A fluid feeding circuit, not shown, comprises: a pipe 181 feeding the annular chamber 180 formed between the membrane 179 and the internal wall of cylinder 170, a pipe 182 feeding the compartment 183 delimited by the end of the cylinder 170 opposite to the opening 171 and by the piston 172, and a pipe 190 feeding the compartment 191 delimited by the portion of the second cylinder adjacent to the first cylinder and by the second piston 174.

The operation of the device according to this embodiment is similar to that of the preceding device.

When the movable elements 2a, 2b are in a position of contact, the first piston 172 is at the bottom of cylinder 170, i.e. close to its end opposite to the movable elements, and the second piston 174 is near the closed end of the second cylinder 173.

The compartment 183 in the first cylinder has its minimum volume and the compartment 191 in the second cylinder has its maximum volume.

The push-member 187 is entirely retracted in the cylinder 170. There is a clearance between the cylindrical wall of the push-member 187 and the membrane 179 (FIG. 5).

Oil is introduced, through pipe 182, into the compartment 183. The piston 172 is pushed toward the other end of the cylinder until it reaches the shoulder 176. The damping device 189 avoids a direct contact of the metal parts.

The end of the push-member 187 opposite to piston 172 pushes the movable element 2b, thereby moving it away from element 2a. When the movable elements are in their final spaced apart position, i.e. spaced at the maximum distance from each other, a fluid, e.g. oil, is introduced, through pipe 181, into the compartment 180 and strongly presses the membrane 179 against the push-member 187.

Subsequently oil is introduced through pipe 190, into the compartment 191 and displaces the second piston 174 toward the bottom of the first cylinder and therewith the first piston 172. The subsequent operating steps are the same as for the preceding embodiment.

According to a third embodiment illustrated, by way of example, in FIGS. 6, 7 and 8, the emitting device comprises, as it is described in the U.S. Pat. No. 3,564,492, two movable elements 2a and 2b.

Two annular bands 6a and 6b of elastic material are each secured by its internal circumference to the external circumference of one of the movable elements 2a, 2b. The external circumference of each band is secured to a coupling flange 86.

The hydraulic system which constitutes the present improvement and which is used for actuating and for locking the movable elements is solid with one of said elements, 2a.

It comprises essentially a first cylinder 200 having at one end a tight bottom 201 and at the other end a bottom 202 having an orifice 203. A first piston 204 and its rod 205, placed inside the cylinder 200, are solid with the bottom 201 thereof. The diameter of the first piston is less than that of the first cylinder. The rod 205 of the first piston comprises an internal duct 206 passing through the bottom 201 of the cylinder 200 and opening into said cylinder through orifices 207. A second piston 208 whose diameter is substantially equal to the internal diameter of cylinder 200 is provided with a hollow stem 209 whose internal diameter is substantially that of piston 204 and freely slides in the first cylinder around the first piston rod 205.

A second cylinder 210 having one open end is secured by said end to the bottom portion 202 of said first cylinder so as to have the same longitudinal axis. The other end of cylinder 210 has a bottom 211 provided with an orifice 212. The bottom 211 is provided, inside the cylinder 210, with an annular stop member 213. The internal wall of said cylinder comprises, at the end thereof which is secured to the bottom 202, an annular shoulder 214 forming a portion of reduced internal diameter of the cylinder. The cylinder 210 is associated to two feeding ducts, the first one 215 opening into the cylinder portion close to the bottom 202 and the second one 216 opening into the bottom portion 211, between the stop member 213 and the orifice 212.

A push-member 217, of cylindrical shape, freely slides inside both cylinders and is guided by the walls of the orifices 203 and 212. This member is provided with an annular protrusion 218 whose external diameter is slightly less than the internal diameter of the shoulder 214 and which acts as an annular valve member, whose stroke is limited by the bottom 202 of the first cylinder and by the stop member 213 of the bottom portion of the second cylinder.

The push-member is hollow and slidable around the stem 209 of the second piston. One of its ends may take its bearing on the second piston 208 and the other end on the movable element 2b.

Both cylinders 200 and 210 are fed with oil through an oil distributing device, shown in FIG. 6. Said circuit comprises a pump P, feeding two distributors $D_1$ and $D_2$ from an oil tank C.

The distributor $D_1$ controls the circuit for actuation of piston 208 which comprises a pipe 219 connecting the pump P to the distributor $D_1$, a pipe 206a connecting the distributor $D_1$ to the internal duct 206 of the first piston at its opening into the bottom 201, and a pipe 221 for the oil return from the distributor $D_1$ to the tank C.

The distributor $D_2$ controls the circuit actuating the valve member 218 solid with the push-member 217, whereby the locking and the unlocking of the movable elements 2a and 2b are performed. This circuit comprises a pipe 222 connecting the pump P to the distributor $D_2$, a pipe 216a connecting the distributor $D_2$ to the duct 216 of the second cylinder, and a pipe 223 for the oil return from the distributor $D_2$ to the tank C.

A pipe 215a, provided with a non-return valve A, connects the pipe 220 associated to the distributor $D_1$ with the duct 215 of the second cylinder.

The operation of the emitting device is as follows:

At a first period, the device is in the position shown in FIG. 6. The movable elements 2a and 2b are in their closest position, both in contact with the spring plate 100. The second piston 208 is in the bottom part of the first cylinder 200 near the bottom 201 and the push-member has one end bearing on the piston 208 and the other end bearing on the movable element 2b.

By actuating the distributor $D_1$ which feeds, through pipe 220, the first cylinder compartment defined between the piston 208 and the bottom 201, the second piston 208 is pushed and drives therewith the push-member 217, bearing on the movable element 2b, thereby moving the elements 2a and 2b away from each other.

At the end of the stroke of the piston 208 and the push-member 217, the annular valve member 218 abuts against the annular stop member 213, thereby closing the outlet of duct 216 in which the pressure is then reduced to the atmospheric one by the distributor $D_2$ so that the fluid present under the valve member 218 is no longer pressurized.

Simultaneously the distributor $D_1$ feeds with pressurized oil, through pipe 215a and duct 215, the portion of the second cylinder 210 between the annular valve member 218 and the bottom 202 of the first cylinder, said portion of the second cylinder being already filled with oil at low pressure when starting the operation of the apparatus. The push exerted on this valve member maintains it pressed against the stop member 213 since the pressurized oil contained in the second cylinder 210 cannot flow back to pipe 220 as a result of the action of the non-return valve A and the system is thus locked (FIG. 7).

The push-member 217 being kept in this position, we actuate the distributor $D_1$ so that it no longer feeds pipe 220 but feeds, through pipe 206a, duct 206 and orifices 207, the space inside the stem 209 and delimited by the pistons 204 and 208, thereby pushing the piston 208 toward the bottom 201 of the first cylinder.

The oil present in the space of the first cylinder between the piston 208 and the bottom 201 is forced through pipe 220 toward the distributor $D_1$ and from there to the tank C through pipe 221. The non-return valve A associated with the pipe 215 prevents the return of the oil to said pipe.

The device is thus ready for a shot (FIG. 8).

At the moment selected for the shot, while maintaining the feeding of pipe 206a and duct 206, we actuate the distributor $D_2$ so as to feed with oil the pipe 216a, the duct 216 and the annular space defined between the bottom 211, the stop member 213 and the valve member 218. The oil pressure is exerted on the valve member 218 which starts moving away from the stop member 213. At that time the oil pressure becomes equal on both sides of the valve member 218, which, accordingly, is no longer pressed against the stop member 213. The oil supply through pipe 216a and duct 216 may be discontinued and the push-member continues to slide in the two cylinders, the elements 2a and 2b being abruptly urged toward each other. A too abrupt stopping at the end of the stroke is avoided by a laminar flow of the oil between the valve member 218 and the shoulder 216, resulting in a dampening of the movement of the push-member.

The device has then returned to its initial position (FIG. 6) and a new cycle of operations may be performed again.

We claim:

1. A device for emitting acoustic waves in a liquid medium, comprising at least two elements movable in opposite directions, said elements being made of a rigid material and connected with a tightening membrane forming a tight enclosure therewith, each of said elements comprising at least one area for intermittent application against a corresponding contact area of an opposite element, means for moving said areas apart from each other comprising a push-member adapted to bear onto one of the movable elements, releasable means for locking said movable elements in spaced apart position, means for limiting the deformation of said tightening membrane toward the inside of the enclosure, and means for creating in said enclosure a pressure much lower than the pressure to which the enclosure is externally subjected, in operation of the device, wherein the means for moving said areas apart from each other further comprise fluid pressure operated jack means including two cylinders associated with the other of the movable elements for intermittently pushing the push-member in a direction towards said one element, and the releasable locking means comprises a valve member connected with said push-member, pressure means for moving said push-member towards said one element by exerting different fluid forces in one of the cylinders on opposite faces of the valve member in a manner intermittently maintaining said valve member in abutment against an end portion of said one of the cylinders regardless of fluid pressure conditions in the other of the cylinders and means for feeding said cylinders with pressurized fluid for controlling operation of the jack means.

2. A device according to claim 1, wherein the push-member has a cylindrical shape and the valve member consists of an annular protrusion of said push-member.

3. A device according to claim 1, wherein the pressure means for intermittently maintaining the valve member consists of a means for introducing a pressurized liquid in a portion of the one cylinder opposite to said one cylinder end portion.

4. A device according to claim 1, wherein said one cylinder end portion is provided with a stop member.

5. A device according to claim 4, wherein the stop member is annular and forms a bearing for the valve member.

6. A device according to claim 4, wherein the stop member is annular and wherein the releasable locking means further comprises means for introducing a pressurized liquid in the annular space delimited between the annular stop member, the one cylinder end portion and the push-member for causing movement of the push-member in a direction away from said one element.

7. A device according to claim 1, wherein said cylinder is filled with liquid and the valve member is associated with an internal annular shoulder of the one cylinder of a diameter slightly greater than that of the valve member, so as to produce a laminar flow of the liquid in said one cylinder, resulting in a damping of the push-member movement.

8. A device for emitting acoustic waves in a liquid medium, comprising at least two elements movable in opposite directions, said elements being made of a rigid material and connected with a tightening membrane forming a tight enclosure therewith, each of said elements comprising at least one area for intermittent application against a corresponding area of an opposite element, means for moving said contact areas apart from each other comprising a push-member adapted to bear onto one of the elements, releasable means for locking said movable elements in spaced apart position, means for limiting the deformation of said tightening membrane toward the inside of the enclosure, and means for creating in said enclosure a pressure much lower than the pressure to which the enclosure is externally subjected, in operation of the device wherein the means for moving the movable elements apart from each other further comprise a fluid pressure operated jack means including a first cylinder associated with a first piston provided with a rod secured to the first cylinder, a second piston slidable around the rod of the first piston under action of a pressurized fluid and having a stem slidable in the first cylinder around the first piston, a second cylinder connected with and having the same longitudinal axis as the first cylinder, the push-member being slidable in the two cylinders around the stem of the second piston upon intermittent action of said second piston an annular valve member connected with the push-member and displaceable in said second cylinder, pressure means for intermittently maintaining the valve member in abutment against end portion of the second cylinder by exerting on the valve member different fluid forces on opposite faces of the valve member regardless of fluid pressure conditions acting on the first piston and means for feeding the cylinders with pressurized fluid for controlling operation of the jack-means.

* * * * *